US009860495B2

(12) United States Patent
Smith

(10) Patent No.: US 9,860,495 B2
(45) Date of Patent: Jan. 2, 2018

(54) PROJECTOR WITH ROTATING REFRACTIVE ACTUATOR

(71) Applicant: TEXAS INSTRUMENTS INCORPORATED, Dallas, TX (US)

(72) Inventor: Steven E. Smith, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/993,831

(22) Filed: Jan. 12, 2016

(65) Prior Publication Data

US 2016/0205361 A1 Jul. 14, 2016

Related U.S. Application Data

(60) Provisional application No. 62/102,222, filed on Jan. 12, 2015.

(51) Int. Cl.
*G03B 21/00* (2006.01)
*G03B 21/13* (2006.01)
*H04N 9/31* (2006.01)
*G02B 26/08* (2006.01)
*G03B 21/14* (2006.01)

(52) U.S. Cl.
CPC ......... *H04N 9/315* (2013.01); *G02B 26/0833* (2013.01); *G02B 26/0875* (2013.01); *G03B 21/008* (2013.01); *G03B 21/14* (2013.01); *H04N 9/3114* (2013.01); *H04N 9/3188* (2013.01); *G03B 21/13* (2013.01)

(58) Field of Classification Search
CPC ........ G03B 21/13; G03B 21/14; H04N 9/315; H04N 9/3188; H04N 9/3114; G02B 26/0875
See application file for complete search history.

(56) References Cited

U.S. PATENT DOCUMENTS

| 5,729,383 | A | 3/1998 | Chastang et al. |
| 5,774,179 | A | 6/1998 | Chevrette et al. |
| 5,798,875 | A | 8/1998 | Fortin et al. |
| 5,909,323 | A | 6/1999 | Blake et al. |
| 6,636,368 | B2 | 10/2003 | Ohtaka |
| 6,850,352 | B1 | 2/2005 | Childers |
| 6,985,278 | B2 | 1/2006 | Chu et al. |
| 7,113,231 | B2 * | 9/2006 | Conner ............ G02B 26/0875 348/742 |
| 7,336,290 | B2 | 2/2008 | Marshall et al. |
| 2002/0118375 | A1 | 8/2002 | Ramanujan et al. |
| 2005/0083511 | A1 | 4/2005 | Markle |

(Continued)

*Primary Examiner* — Ryan Howard
(74) *Attorney, Agent, or Firm* — Michael A. Davis, Jr.; Charles A. Brill; Frank D. Cimino

(57) ABSTRACT

An image projector includes a digital micro device (DMD) spatial light modulator and a rotatable actuator. The rotatable actuator is disposed in a path of light reflected from the spatial light modulator. The rotatable actuator includes a first region and a second region. The first region is tilted at a first non-normal angle with respect to an axis of rotation of the rotatable actuator. The second region is tilted at a second non-normal angle with respect to the axis of rotation of the rotatable actuator. Light reflected by the spatial light modulator and passing through the first region is displaced one pixel relative to light reflected by the spatial light modulator and passing through the second region.

22 Claims, 4 Drawing Sheets

(56) References Cited

U.S. PATENT DOCUMENTS

| | | |
|---|---|---|
| 2005/0145806 A1 | 7/2005 | Marshall |
| 2005/0146540 A1 | 7/2005 | Marshall et al. |
| 2005/0259227 A1* | 11/2005 | Choi .................. H04N 9/317 |
| | | 353/69 |
| 2006/0017887 A1 | 1/2006 | Jacobson et al. |
| 2006/0056076 A1 | 3/2006 | Araki et al. |
| 2006/0176323 A1 | 8/2006 | Bommersback et al. |

* cited by examiner

PROJECTOR WITH ROTATING REFRACTIVE ACTUATOR

CROSS-REFERENCE TO RELATED APPLICATIONS

This application claims priority to U.S. Provisional Patent Application No. 62/102,222, filed Jan. 12, 2015, titled "Rotating Refractive Extended Pixel Resolution Actuator," which is hereby incorporated herein by reference in its entirety.

BACKGROUND

DIGITAL LIGHT PROCESSING (DLP) technology is a light manipulation technology that is used in a variety of projection systems. A DLP projection system is an image projection system that includes a light source focused on a controllable multiple mirror element, with a lens assembly that focuses the light reflected by the multiple mirror element and projects the reflected light onto an image screen. Each mirror corresponds to an image pixel, and the mirrors are controlled digitally to turn each image pixel on or off. The multiple mirror element may be referred to as a digital mirror device (DMD). A DMD is a semiconductor-based "light switch" array that includes a large number (thousands or millions) of individually addressable, tiltable, mirrors. Each mirror of the DMD is attached to one or more hinges on which the mirror can tilt. Addressing circuitry associated with each mirror generates electrostatic forces that can selectively tilt the mirror. The DMD is a spatial light modulator and provides many advantages to light-steering applications.

For display applications, the DMD is addressed with image data. Responsive to the image data, light is selectively reflected from each mirror for projection. When individual mirrors direct light through an imaging lens, an imaging surface, such as a screen, is selectively illuminated. When the mirror reflects light away from the imaging lens, the reflected light is collected in a discard area. Modulation techniques are used to provide grayscale images. A quick succession of frames is perceived by the viewer as a full motion display.

There are a variety of techniques for generating color displays using a DMD. One approach is to generate multiple images with multiple spatial light modulators (SLMs). For example, one SLM may be used for each of red, green and blue. Each image has a desired intensity and the images are combined to result in a correctly colored display. A second approach is to use a single SLM and generate images for each color (red, green, and blue) sequentially. A white light source may be filtered through a revolving color wheel, and each color reflected by the SLM to produce a desired color in the projected image. The differently colored images are generated so quickly that the eye of the view integrates the images into a correctly colored frame.

DLP technology made possible by the advent of DMD chips has led to the emergence of significant new projection display technology. In addition to commercial success in high definition television, theater projection systems, business and personal projection systems, DLP technology is being applied in the areas of adaptive lighting, medical imaging, photo-finishing, biotechnology applications, lithography, spectroscopy, and scientific instrumentation, and other applications.

SUMMARY

In described examples, an image projector includes a digital micro device (DMD) spatial light modulator and a rotatable actuator. The rotatable actuator is disposed in a path of light reflected from the spatial light modulator. The rotatable actuator includes a first region and a second region. The first region is tilted at a first non-normal angle with respect to an axis of rotation of the rotatable actuator. The second region is tilted at a second non-normal angle with respect to the axis of rotation of the rotatable actuator. Light reflected by the spatial light modulator and passing through the first region is displaced one pixel relative to light reflected by the spatial light modulator and passing through the second region. The light passing through the first region may be displaced one half the pixel diagonal relative to light passing through the second region.

BRIEF DESCRIPTION OF THE DRAWINGS

For a detailed description of various examples, reference will now be made to the accompanying drawings in which.

DETAILED DESCRIPTION OF EXAMPLE EMBODIMENTS

Figure 1:
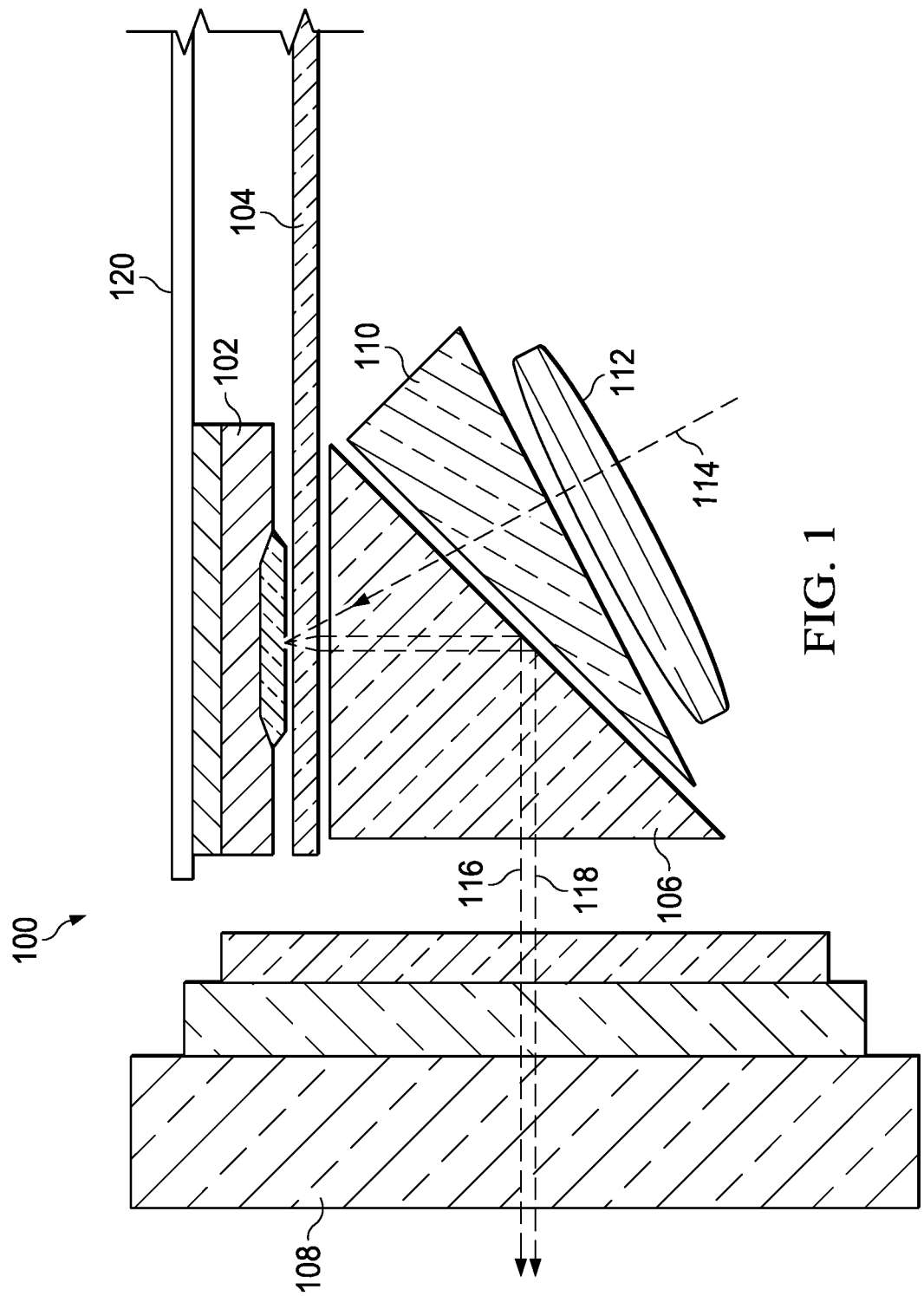
FIG. 1 is a schematic representation of an image projection system in accordance principles disclosed herein.

Digital micro device (DMD) spatial light modulators provide a number of advantages over competing image generation technologies. DMD based projection devices may be smaller and less costly than projection systems based on other technologies. However, DMD-based projection systems are not with limitations. In some applications, the pixel resolution of a projection system may be limited by the number of mirrors provided by the DMD. To provide pixel resolution that exceeds the number of mirrors on the DMD, some projection systems provide an actuator in the projection path that displaces an image generated by the DMD. For example, two successive images generated by the DMD may offset from one another and interlaced to generate a higher resolution image.

In some conventional DMD projection systems, an actuator for image resolution enhancement includes an optical element or window (such as a thin glass plate) in the projection path that displaces each image frame by ½ pixel thereby generating 2 on-screen pixels for each DMD mirror. Such an actuator is conventionally placed between a prism and a projection lens, and tilted back and forth at a predetermined frequency (such as an integer multiple of 60 Hertz) to displace the pixels. The tilting of the plate may be effected using voice coil motors disposed adjacent to a frame about the glass plate.

Unfortunately, conventional tilting actuators may be large and complex. The voice coils are much thicker than the glass plate, and therefore increase the gap between the prism and projection lens, which in turn requires use of larger and more expensive lenses to capture the projected light as it expands from the prism. Furthermore, design of the voice coil motors and the associated drive circuitry is challenging because the devices are highly specialized and the close tolerances the must be achieved to produce a high quality image. For example, the drive waveform that energizes the voice coil motor must ensure the plate motion rise time to position is minimized without too much overshoot. Also, the waveform must minimize the ripple or mini-oscillations while the plate is tilted. These overshoot and ripples are 10-20% of the total tilt, near the specification limit. The drive waveform frequency is typically 60 Hz or a multiple thereof with a rise time of less than 1 ms between positions.

Embodiments of the projection system disclosed herein include a rotating actuator that overcomes the deficiencies of conventional tilting actuators. The rotating actuator includes a glass disk. A first portion of the disk is tilted so as to form a section of shallow cone. A second portion of the disk is tilted in an opposite direction from the first portion to form a section of a second shallow cone. As the disk rotates, reflected light from the DMD passes in-turn through the two portions of the disk to alternately displace the pixels and produce enhanced image resolution by multiplying the number of displayed pixels. The disk may be relatively thin, which allows placement of the rotating actuator between the DMD and prism, thereby greatly reducing the distance between the prism and the projection lens, and reducing the overall cost of projector optics. Embodiments allow the rate of pixel displacement to be increased by increasing actuator rotation speed or by increasing the number of cone portions provided on the disk. Additionally, because actuator rotation is constant, no complex drive waveforms are needed. Overshoot and ripple may also be eliminated.

FIG. 1 shows a schematic representation of an image projection system 100 in accordance principles disclosed herein. The image projection system 100 includes a DMD 102, a rotatable actuator 104 (also referred to herein as a "rotating actuator"), a reverse total internal reflection (RTIR) prism 106, a projection lens 108, a wedge prism 110, and a lens 112. The DMD 102 may be mounted on a substrate such as a printed circuit board 120. Various components of the projection system 100 have been omitted in the interest of clarity. For example, the projection system 100 may also include a light source that generates the light 114 reflected by the DMD 102, control systems that transfer image data to the DMD 102 and synchronize rotation of the actuator 104 with image generation in the DMD 102, a motor that rotates the actuator 104, power supplies, cooling systems, audio systems, additional optical elements, enclosures, and other components.

In the projection system 100, the lens 112 directs the light beam 114 into the wedge prism 110. The geometry of the wedge prism 110 may allow the light beam 114 to pass along a substantially straight line through the wedge prism 110 and the RTIR prism 106. The mirrors of the DMD 102 are set to reflect the light beam 114 towards or away from the projection lens 108. Light to be projected, via the projection lens 108, is reflected into the RTIR prism 106 through the rotating actuator disk 104, and reflected in the RTIR prism 106 to the projection lens 108.

Figure 3:
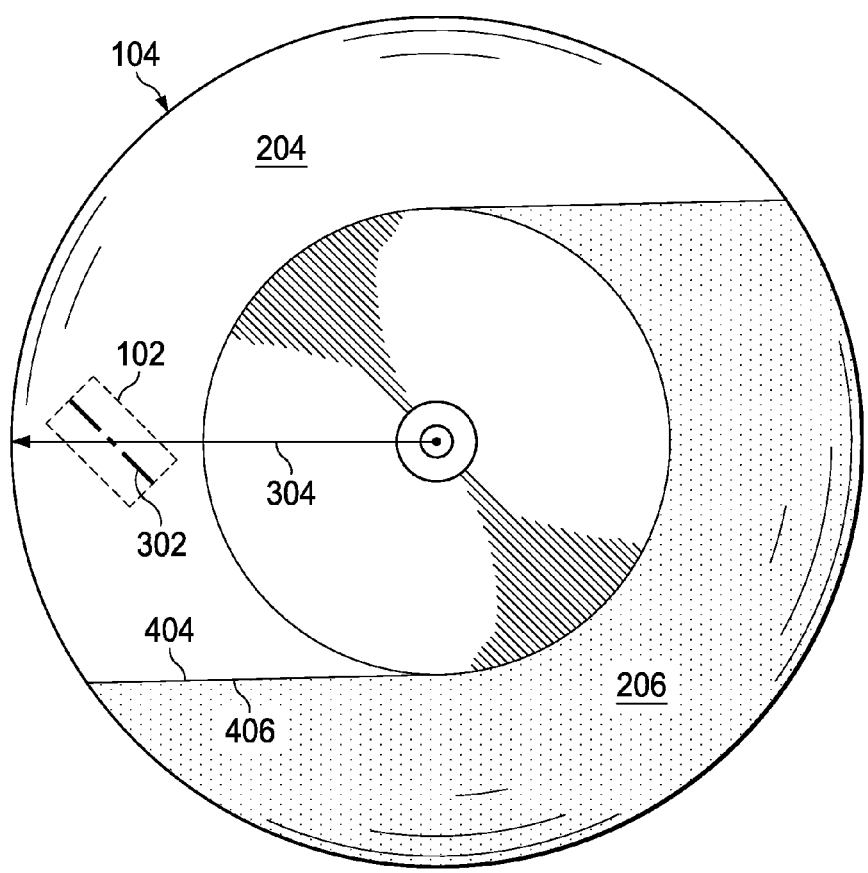
FIG. 3 is a top view of an actuator disk in accordance with principles disclosed herein.

FIG. 3 shows a top view of an actuator disk 104 in accordance with principles disclosed herein. The actuator disk 104 includes a first region 204 and a second region 206. The first region 204 may be tilted at a first non-normal angle with respect to the central axis (i.e., the axis of rotation) of the actuator disk 104. For example, the first region 204 may be tilted +1° or less with respect to a plane that is normal to the axis of rotation and passes through the center of the actuator disk 104. Similarly, the second region 206 may be tilted at a second non-normal angle with respect to the central axis. Accordingly, the second region 206 may be tilted −1° or degree or less with respect to the plane that is normal to the axis of rotation. Generally, the angle of tilt applied to the second region 206 will be 180° from that applied to the first region 204. The angle of tilt applied to the first region 204 and the second region 206 may vary based on a desired pixel displacement distance and/or thickness of the actuator disk 104. For example, a thicker embodiment of the actuator disk 104 may apply a smaller tilt angle to achieve the same pixel displacement as is achieved using a larger tilt angle with a thinner embodiment of the actuator disk 104.

Figure 4:
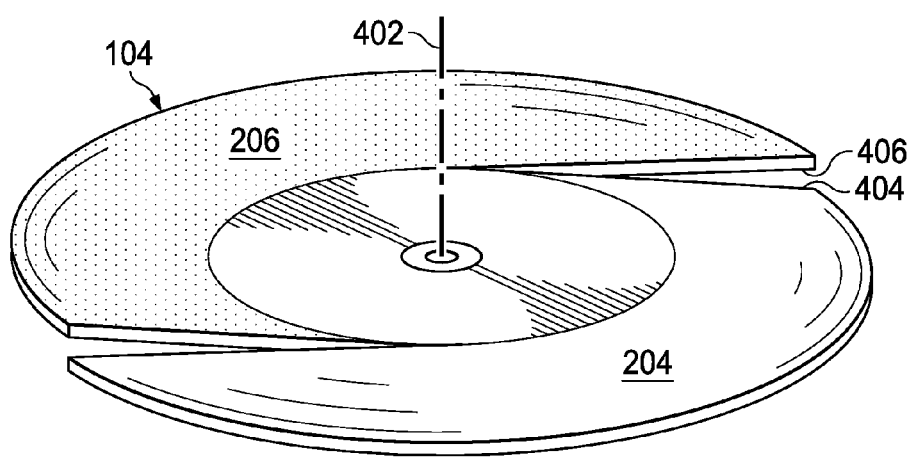
FIG. 4 is a perspective view of an actuator disk in accordance with principles disclosed herein.

FIG. 4 shows a perspective view of the actuator disk 104. Edge 404 of first region 204 and edge 406 of region 206 illustrate the opposing tilt angles of the two regions 204, 206. Other embodiments of the actuator disk 104 may include more than two tilted regions. For example, an embodiment of the actuator disk 104 may include four alternately tilting regions where each of the four regions occupies ¼ of the circumference of the disk 104 and each region is adjacent two regions of opposite tilt. That is, a first region tilted as per region 204 is adjacent to a second region tilted as per region 206 which is adjacent to a third region tilted as per region 204 which is adjacent to a fourth region tilted as per region 206. By increasing the number of tilted regions, the frame rate of the projection system 100 may be increased with increasing the rotation rate of the actuator disk 104.

Figure 5:
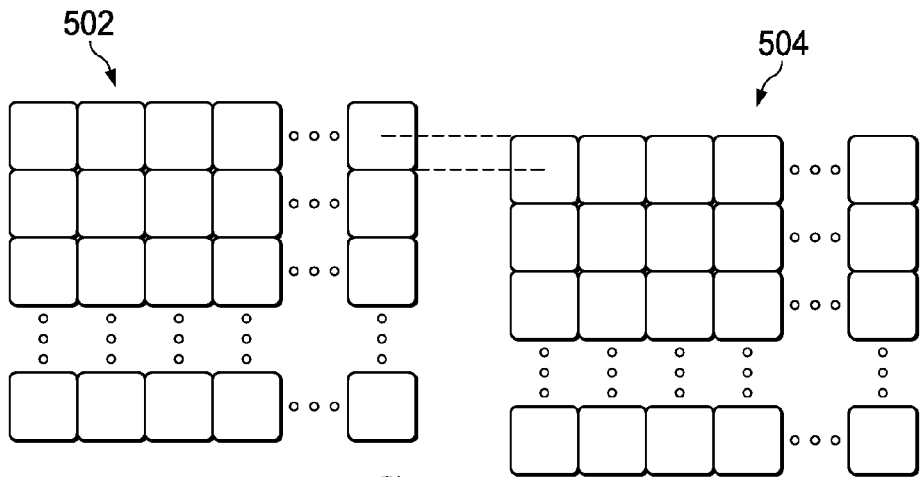
FIG. 5 is an illustration of pixel displacement produced by an actuator disk in accordance with principles disclosed herein.

FIG. 5 shows an example of pixel displacement by the rotating actuator 104. In FIG. 5, two pixel arrays are shown. Array 502 shows the location of pixels if the rotating actuator 104 is not used to refract the light reflected by the DMD 102. Array 504 shows pixels that are vertically displaced by ½ pixel from the locations of the pixels in array 502. The displacement may be produced by refracting the light reflected by the DMD 102 in the first region 204 of the rotating actuator 104. In similar fashion, the second region 206 may vertically displace light reflected by the DMD 102 by ½ pixel in the opposite direction from the displacement produced by the first region 204, such that the pixels of the two arrays produced by displacement in the first and second regions 204, 206 are offset from one another by 1 pixel.

Returning now to FIG. 1, as light reflected by a mirror of the DMD 102 passes through the actuator disk 104, the light is refracted to produce a displacement that is a function of which of the first and second regions 204, 206 the light is passing through. In some embodiments, refraction in region 204 displaces the light passing through the actuator disk 104 by ½ pixel in one direction, while refraction in region 206 displaces the light passing through the actuator disk 104 by ½ in the opposite direction. Light signals 116 and 118, in FIG. 1, illustrate the light reflected by a given mirror of the DMD 102 displaced by the regions 204, 206 of the rotating actuator 104 to form two different pixels.

Rotation of the actuator disk 104 is synchronized with generation of images by the DMD 102. That is, the pattern of the mirrors of the DMD 102 may be changed in synchronization with rotation of the actuator disk 104 such that while light reflected from the DMD 102 is passing through the first region 204 of the actuator disk 104 a first pattern of mirrors is applied, and while light reflected from the DMD 102 is passing through the second region 206 of the actuator disk 104 a second pattern of mirrors is applied. Thus, different and displaced pixel patterns, produced by the different mirror patterns, may be combined for form a single display having enhanced resolution. For example, odd rows of pixels may generated while passing light reflected from the DMD 102 through the first region 204 of the actuator disk 104, and even rows of pixels may generated while passing light reflected from the DMD 102 through the second region 206 of the actuator disk 104.

In some embodiments of the projection system 100, rotation of the actuator disk 104 may also be synchronized with the display of color patterns. In the projection system 100, color images may be formed by successively directing light beams of different colors to the DMD 102 and successively setting the mirrors of the DMD 102 for each color. For example, if red, green, and blue colors are used to produce a color image, then for each image frame, the red light may be directed to the DMD 102 for a first interval, green light may be directed to the DMD 102 for a second interval, and blue light may be directed to the DMD 102 for a third interval. The mirror pattern of the DMD 102, and the duration for which each mirror reflects light to the projection lens 108 may change for each light color. Ultimately, the viewer's visual system mixes the projected colors to produce the final image colors. The different light beam colors directed to the DMD 102 may be generated by passing a white light beam through the filters of a rotating color wheel, by activation of colored light sources, or by other means of colored light generation.

Actuator disk rotation may be synchronized with the colors of light reflected by the DMD 102 to minimize the effects of the pixel shift at the transition between the regions 204 and 206 of the actuator disk 104. For example, the rotation of the actuator disk 104 may be synchronized with color generation such the edges 404, 406 of the actuator disk 104 pass through the light reflected from the DMD 104 while a selected light color is being reflected by the DMD 104. The selected light color be a color deemed to be the "darkest" (such as the color to which the viewer's eye is least sensitive) of the light colors. In some embodiments, the selected light color may be blue. Thus, actuator rotation may be synchronized with color generation to cause the edges 404, 406 of the actuator disk 104 to pass across the face of the DMD 104 while the DMD 104 is reflecting blue light.

The projection system 100 may also orient the DMD 102 and the edges 404, 406 to reduce the visual effects of the transition between the regions 204 and 206 of the actuator disk 104. In FIG. 3, the DMD 102 is shown oriented at a 45° angle relative to a radius 304 of the actuator disk 104 passing through a central point (or a segment normal to a central point) of the DMD 102. The edges 404, 406 that define the transitions between the regions 204, 206 are similarly angled, such that the transition between the regions 204, 206 passes over the DMD 102 as a segment parallel to the longitudinal center line 302 of the DMD 102. Such an arrangement, in effect, reduces the "rise time" associated with transitioning from one pixel displacement to another.

Figure 2:
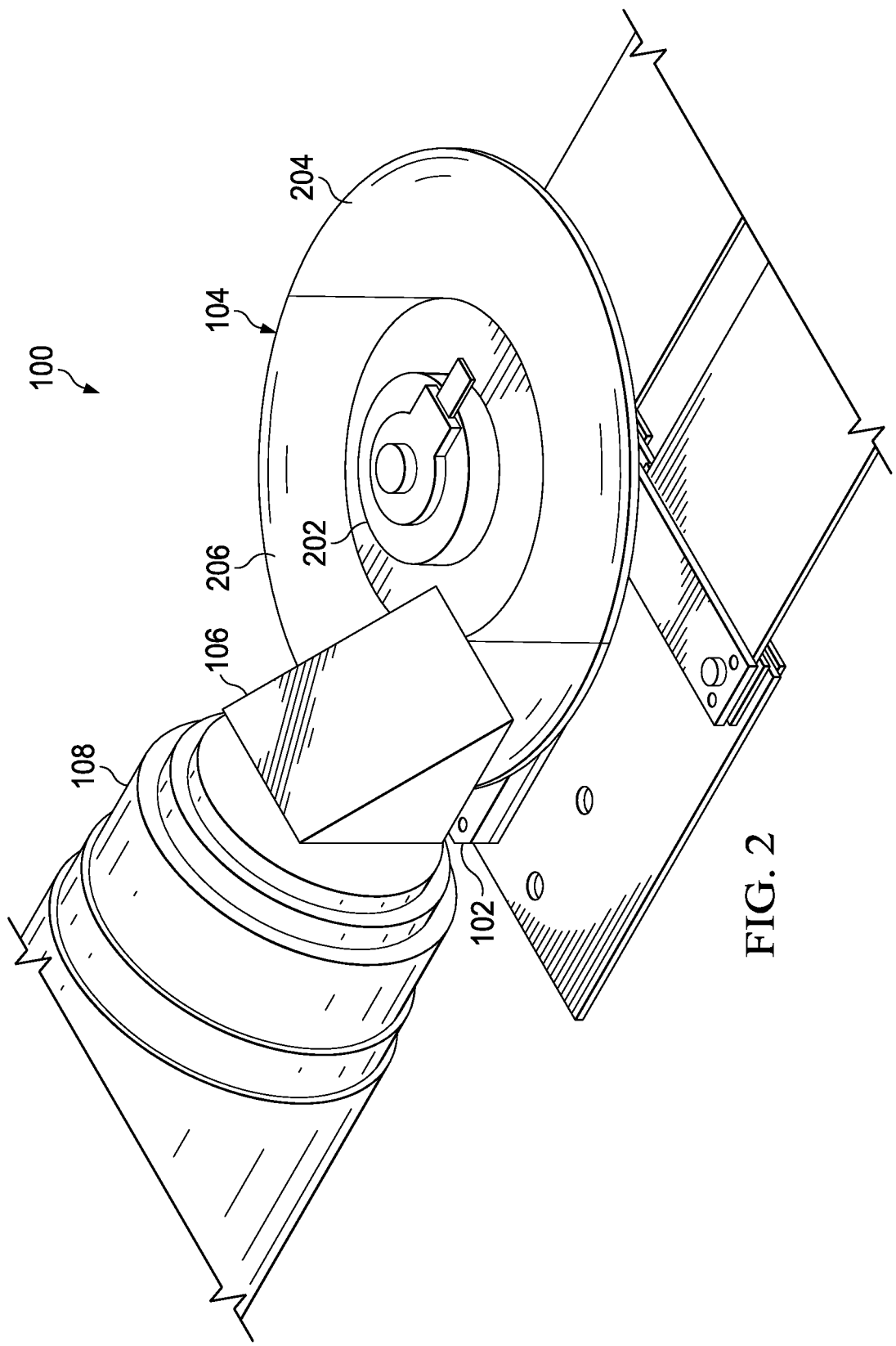
FIG. 2 is a perspective view of a portion of an image projector in accordance with principles disclosed herein.

FIG. 2 shows a perspective view of a portion of an image projector 100 in accordance with principles disclosed herein. More specifically, FIG. 2 shows the DMD 102, the RTIR prism 106, the rotating actuator 104, a motor 202 for turning the rotating actuator 104, and the projection lens 108. While embodiments of the projection system 100 are described herein as having the rotating actuator 104 disposed between the RTIR prism 106 and the DMD 102, in some embodiments, the rotating actuator 104 may be disposed at a different point in the projection path. For example, in some embodiments of the projection system 100, the rotating actuator 104 may be disposed between the RTIR prism 106 and the projection lens 108.

Figure 6:
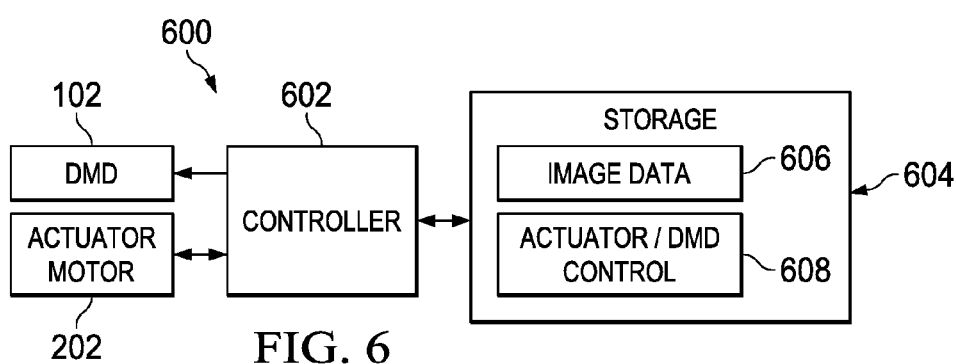
FIG. 6 is a block diagram for a control system of an image projector in accordance with principles disclosed herein.

FIG. 6 shows a block diagram for a control system 600 of the image projector 100 in accordance with principles disclosed herein. The control system 600 includes a controller 602 and storage 604. The controller 602 is coupled to the DMD 102 and the actuator motor 202. Various components of the control system 600 have been omitted in the interest of clarity. For example, the control system 600 may include input/output interfaces that facilitate the transfer of image data to the control system 600 from a source coupled to the projection system 100, network adapters, etc.

The controller 602 may include a general-purpose microprocessor, digital signal processor, microcontroller, or other device capable of executing instructions retrieved from a computer-readable storage medium. Processor architectures generally include execution units (such as: fixed point, floating point, integer, or other execution units), storage (such as registers or memory), instruction decoding, peripherals (such as interrupt controllers, timers, and/or direct memory access controllers), input/output systems (such as serial ports, parallel ports, etc.) and various other components and sub-systems. The controller 602 may also include motor control and drive circuitry, specialized video/graphics processing systems, etc.

The storage 604 is a non-transitory computer-readable storage medium suitable for storing instructions executable by the controller 602, and for storing image data 606 that defines the images to be displayed by the projection system 100. The storage 604 may include volatile storage such as random access memory, non-volatile storage (such as a hard drive, an optical storage device (for example a CD or DVD drive), FLASH storage, read-only-memory), or combinations thereof.

The storage 604 includes an actuator/DMD control module 608 that includes instructions for controlling the operation of the DMD 102 and the rotating actuator 104. For example, the controller 602 may execute instructions of the actuator/DMD control module 608 to derive mirror patterns from the image data 606, to transfer mirror pattern data to the DMD 102, to synchronize rotation of the actuator 104 with the images to be interlaced as generated by the DMD 102, to synchronize the generation of colored light beams directed to the DMD 102 with transfer of mirror pattern data to the DMD 102, and/or to synchronize rotation of the actuator 104 with the generation of the colored light beams.

Some embodiments of the control system 600 include dedicated control circuitry that performs at least some of the functions described above. Some embodiments may control the rotating actuator 104, the DMD 102, and other components of the projection system 100 via a combination of dedicated control circuitry and execution of instructions provided in the storage 604.

Figure 7:
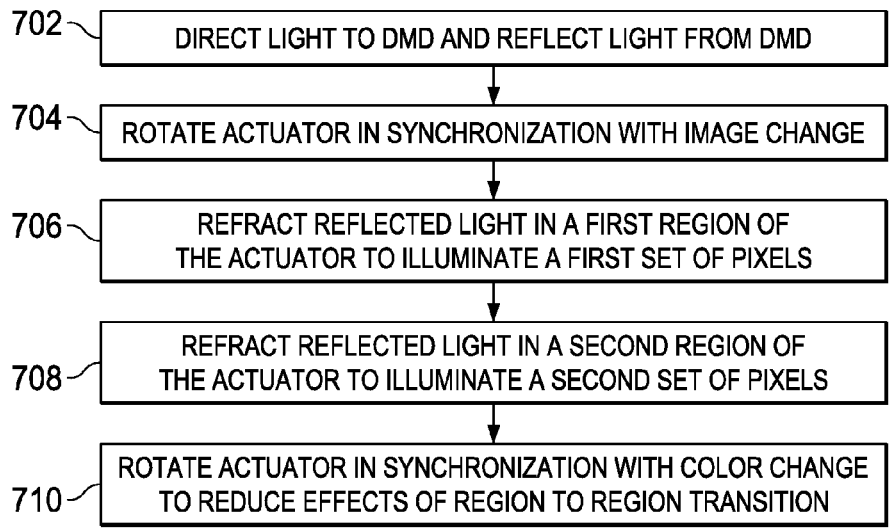
FIG. 7 is a flow diagram for a method for projecting an image in accordance with principles disclosed herein.

FIG. 7 shows a flow diagram for a method for projecting an image in accordance with principles disclosed herein. Though depicted sequentially as a matter of convenience, at least some of the actions shown can be performed in a different order and/or performed in parallel. Additionally, some embodiments may perform only some of the actions shown. In some embodiments, at least some of the operations of FIG. 6, as well as other operations described herein, can be implemented by the projection system 100 as disclosed herein.

In block 702, a light beam is directed to the DMD 102. The DMD 102 is loaded with mirror pattern data (derived from image data 606) and the mirrors of the DMD 102 are set (i.e., the positions of the mirrors are set) in accordance with the mirror pattern data. The mirrors reflect the light beam directed to the DMD 102. At least some of the mirrors reflect the light beam towards the rotating actuator 104.

In block 704, the actuator 104 is rotating, and the rotation of the actuator 104 is synchronized with the timing of image change by the DMD 102. For example, the mirrors of the DMD 102 may change state to produce a new image frame at a predetermined time after the edges 404, 406 of the actuator disk 104 have rotated past the face of the DMD 102. The position of the edges 404, 406 of the actuator disk 104 may be identified by the controller 602 based on an indexing signal, or other position identification signal, generated by the motor 202 or other position sensor coupled to the motor 202 or the rotating actuator 104.

In block 706, the DMD 102 is set to produce a first image frame based on a first set of mirror pattern data. Light reflected by the mirrors of the DMD 102 passes through the first region 204 of the actuator disk 104 and is refracted in accordance with tilt of the first region 204, the thickness of the first region 204, and other parameters to displace the light by a predetermined distance. For example, the light may be displaced by a distance of +½ pixel. The displaced light forms a first set of pixels that constitutes a part of an image to be displayed.

In block 708, the DMD 102 is set to produce a second image frame based on a second set of mirror pattern data. Light reflected by the mirrors of the DMD 102 passes through the second region 206 of the actuator disk 104 and is refracted in accordance with tilt of the second region 206, the thickness of the second region 206, and other parameters to displace the light by a predetermined distance. For example, the light may be displaced by a distance of −½ pixel. Accordingly, the light may be displaced by 1 pixel relative the light refracted by the first region 204. The light displaced by the second region 206 forms a second set of pixels that constitutes part of an image to be displayed, and combines with the first set of pixels to produce an image of enhanced resolution.

In block 710, the rotation of the actuator 104 is synchronized with the color of light reflected by the DMD 102 to minimize the effects of the pixel shift at the transition between the regions 204 and 206 of the actuator disk 104. For example, the rotation of the actuator disk 104 may synchronized with the reflection of a particular color of light by the DMD 102 so that the edges 404, 406 of the actuator disk 104 pass through the light reflected from the DMD 104 while the particular light color is being reflected by the DMD 104. In some embodiments, the particular light color may be blue.

In summary, in described examples, an image projection system and method provide extended pixel resolution. In one embodiment, an image projection system includes a DMD spatial light modulator, a RTIR prism, and a rotatable actuator. The RTIR prism is disposed to receive light reflected by the spatial light modulator. The rotatable actuator is disposed between the spatial light modulator and the RTIR prism. The rotatable actuator includes a first region and a second region. The first region radiates from a center of the rotatable actuator and is tilted at a first non-normal angle with respect to an axis of rotation of the rotatable actuator. The second region radiates from the center of the rotatable actuator and tilted at a second non-normal angle with respect to the axis of rotation of the rotatable actuator.

In another embodiment, a method for projecting an image includes reflecting light via a plurality of mirrors of a DMD spatial light modulator. The method also includes rotating an actuator disposed in a path of light reflected from the spatial light modulator. Light reflected from the spatial light modulator in a first time interval is refracted in a first region of the actuator. Light reflected from the spatial light modulator in a second time interval is refracted in a second region of the actuator. Light reflected from the spatial light modulator in the first time interval corresponds to a first set of pixels, and the light reflected from the spatial light modulator in the second time interval corresponds to a second set of pixels that is spatially offset from the first set of pixels.

In a further embodiment, an image projector includes a DMD spatial light modulator; and a rotatable actuator. The rotatable actuator is disposed in a path of light reflected from the spatial light modulator. The rotatable actuator includes a first region and a second region. The first region is tilted at a first non-normal angle with respect to an axis of rotation of the rotatable actuator. The second region is tilted at a second non-normal angle with respect to the axis of rotation of the rotatable actuator. Light reflected from the spatial light modulator and passing through the first region is displaced by one pixel relative to light reflected from the spatial light modulator and passing through the second region.

Modifications are possible in the described embodiments, and other embodiments are possible, within the scope of the claims.

What is claimed is:

1. An image projection system, comprising:
   a digital micro device (DMD) spatial light modulator;
   a reverse total internal reflection (RTIR) prism disposed to receive light reflected by the spatial light modulator; and
   a rotatable actuator disposed between the spatial light modulator and the RTIR prism, the rotatable actuator including:
   a first region radiating from a center of the rotatable actuator and tilted at a first non-normal angle with respect to an axis of rotation of the rotatable actuator; and
   a second region radiating from the center of the rotatable actuator and tilted at a second non-normal angle with respect to the axis of rotation of the rotatable actuator.

2. The image projection system of claim 1, wherein the second region is tilted by 180 degrees with respect to the first region.

3. The image projection system of claim 1, wherein: the first region is tilted by less than +1 degree with respect to a plane normal to the axis of rotation; and the second region is tilted by less than −1 degree with respect to the plane normal to the axis of rotation.

4. The image projection system of claim 1, wherein the first region is arranged to displace light passing therethrough by one pixel relative to light passing through the second region.

5. The image projection system of claim 1, further including:
   a motor coupled to the rotatable actuator to rotate the rotatable actuator at an integer multiple of 60 revolutions per second, in synchronization with changing of image frames at the spatial light modulator.

6. The image projection system of claim 5, wherein the spatial light modulator is disposed to sequentially reflect light of a plurality of different colors; and the rotatable actuator is disposed to rotate in synchronization with the reflection of the colors such that blue light is reflected by the spatial light modulator while a transition between the first region and the second region passes across a face of the spatial light modulator.

7. The image projection system of claim 1, wherein the spatial light modulator is disposed at a 45 degree angle with respect to a radius of the rotatable actuator that intersects a segment normal to a central point of the spatial light modulator.

8. The image projection system of claim 1, wherein the first region and the second region are arranged such that transitions between the first region and the second region are parallel to a longitudinal center line of the spatial light modulator while the transitions pass across a face of the spatial light modulator.

9. A method of projecting an image, the method comprising:
reflecting light via a plurality of mirrors of a digital micro device (DMD) spatial light modulator;
rotating an actuator disposed in a path of light reflected by the spatial light modulator;
refracting light reflected by the spatial light modulator in a first time interval in a first region of the actuator, wherein the light reflected by the spatial light modulator in the first time interval corresponds to a first set of pixels; and
refracting light reflected by the spatial light modulator in a second time interval in a second region of the actuator, wherein the light reflected by the spatial light modulator in the second time interval corresponds to a second set of pixels that is spatially offset from the first set of pixels;
sequentially reflecting light of a plurality of different colors on the spatial light modulator; and
synchronizing rotation of the actuator with the reflection of the colors of light such that blue light is reflected by the spatial light modulator while a transition between the first region and the second region passes through light reflected by the spatial light modulator.

10. The method of claim 9, wherein the first region is tilted at a first non-normal angle with respect to an axis of rotation of the rotatable actuator, and the second region is tilted at a second non-normal angle with respect to the axis of rotation of the actuator.

11. The method of claim 9, wherein the second region is tilted by 180 degrees with respect to the first region.

12. The method of claim 9, further including:
displacing by ½ pixel light passing through each of the first region and the second region.

13. The method of claim 9, further including:
rotating the actuator at a rate that is an integer multiple of 60 revolutions per second; and
synchronizing rotation of the actuator with changing of image frames at the spatial light modulator.

14. An image projector, comprising:
a digital micro device (DMD) spatial light modulator;
a rotatable actuator disposed in a path of light reflected by the spatial light modulator, the rotatable actuator including: a first region tilted at a first non-normal angle with respect to an axis of rotation of the rotatable actuator; and a second region tilted at a second non-normal angle with respect to the axis of rotation of the rotatable actuator; and
a reverse total internal reflection (RTIR) prism disposed to receive light reflected by the spatial light modulator; wherein the rotatable actuator is disposed between the spatial light modulator and the RTIR prism;
wherein the first region is arranged to displace, by one pixel, light reflected by the spatial light modulator and passing through the first region, relative to light reflected by the spatial light modulator and passing through the second region.

15. The image projector of claim 14, wherein the first region is tilted by no more than +1 degree with respect to the axis of rotation, and the second region is tilted by 180 degrees with respect to the first region.

16. The image projector of claim 14, further including a motor coupled to the rotatable actuator to rotate the rotatable actuator at an integer multiple of 60 revolutions per second, in synchronization with changing of image frames at the spatial light modulator.

17. An image projector, comprising:
a digital micro device (DMD) spatial light modulator; and
a rotatable actuator disposed in a path of light reflected by the spatial light modulator, the rotatable actuator including: a first region tilted at a first non-normal angle with respect to an axis of rotation of the rotatable actuator; and a second region tilted at a second non-normal angle with respect to the axis of rotation of the rotatable actuator;
wherein the first region is arranged to displace, by one pixel, light reflected by the spatial light modulator and passing through the first region, relative to light reflected by the spatial light modulator and passing through the second region; and
wherein the spatial light modulator is disposed to sequentially reflect light of a plurality of different colors, and the rotatable actuator is disposed to rotate in synchronized with the reflection of the colors such that blue light is reflected by the spatial light modulator while a transition between the first region and the second region passes through light reflected by the spatial light modulator.

18. The image projector of claim 17, wherein the first region is tilted by no more than +1 degree with respect to the axis of rotation, and the second region is tilted by 180 degrees with respect to the first region.

19. The image projector of claim 17, further including a motor coupled to the rotatable actuator to rotate the rotatable actuator at an integer multiple of 60 revolutions per second, in synchronization with changing of image frames at the spatial light modulator.

20. An image projector, comprising:
a digital micro device (DMD) spatial light modulator; and
a rotatable actuator disposed in a path of light reflected by the spatial light modulator, the rotatable actuator including: a first region tilted at a first non-normal angle with respect to an axis of rotation of the rotatable actuator; and a second region tilted at a second non-normal angle with respect to the axis of rotation of the rotatable actuator;
wherein the first region is arranged to displace, by one pixel, light reflected by the spatial light modulator and passing through the first region, relative to light reflected by the spatial light modulator and passing through the second region; and
wherein the spatial light modulator is disposed at a 45 degree angle with respect a radius of the rotatable actuator that intersects a segment normal to a central point of the spatial light modulator; and wherein the first region and the second region are arranged such that transitions between the first region and the second region are parallel to a longitudinal center line of the spatial light modulator while the transitions pass the central point of the spatial light modulator.

21. The image projector of claim 20, wherein the first region is tilted by no more than +1 degree with respect to the axis of rotation, and the second region is tilted by 180 degrees with respect to the first region.

22. The image projector of claim 20, further including a motor coupled to the rotatable actuator to rotate the rotatable actuator at an integer multiple of 60 revolutions per second, in synchronization with changing of image frames at the spatial light modulator.

\* \* \* \* \*